US012566573B2

(12) United States Patent
Ben Dayan et al.

(10) Patent No.: US 12,566,573 B2
(45) Date of Patent: *Mar. 3, 2026

(54) FLASH REGISTRY WITH WRITE LEVELING

(71) Applicant: Weka.IO LTD, Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL)

(73) Assignee: Weka.IO (IL)

( * ) Notice: Subject to any disclaimer, the term of this patent is extended or adjusted under 35 U.S.C. 154(b) by 398 days.

This patent is subject to a terminal disclaimer.

(21) Appl. No.: 16/901,049

(22) Filed: Jun. 15, 2020

(65) Prior Publication Data

US 2020/0379686 A1 Dec. 3, 2020

Related U.S. Application Data

(63) Continuation of application No. 16/390,202, filed on Apr. 22, 2019, now Pat. No. 10,684,799, which is a
(Continued)

(51) Int. Cl.
*G06F 3/06* (2006.01)
*G06F 11/14* (2006.01)

(52) U.S. Cl.
CPC .......... *G06F 3/0659* (2013.01); *G06F 3/0604* (2013.01); *G06F 3/0616* (2013.01);
(Continued)

(58) Field of Classification Search
None
See application file for complete search history.

(56) References Cited

U.S. PATENT DOCUMENTS 9,448,887 B1 * 9/2016 Ben Dayan ......... G06F 11/1415
10,394,490 B2 8/2019 Ben Dayan et al.
(Continued)

FOREIGN PATENT DOCUMENTS

CN 106471461 A 3/2017

OTHER PUBLICATIONS

Volkov et al. U.S. Appl. No. 62/524,001. Jun. 2017.*
(Continued)

*Primary Examiner* — Nathan Sadler
(74) *Attorney, Agent, or Firm* — McAndrews Held & Malloy, Ltd.

(57) ABSTRACT
A plurality of computing devices are communicatively coupled to each other via a network, and each of the plurality of computing devices is operably coupled to one or more of a plurality of storage devices. A plurality of failure resilient address spaces are distributed across the plurality of storage devices such that each of the plurality of failure resilient address spaces spans a plurality of the storage devices. Each computing device is operable to maintain a two-level registry that records changes in the memory. When data is read from memory, recent changes to the data may be applied according to one or more corresponding registry blocks. Thus, the two-level registry enables the plurality of computing devices to postpone and/or consolidate writes to memory (e.g., non-volatile flash drives).

32 Claims, 6 Drawing Sheets

Related U.S. Application Data continuation of application No. 15/791,188, filed on Oct. 23, 2017, now Pat. No. 10,394,490.

(52) U.S. Cl.
CPC .......... *G06F 3/0643* (2013.01); *G06F 3/0644* (2013.01); *G06F 3/0664* (2013.01); *G06F 3/067* (2013.01); *G06F 3/0679* (2013.01); *G06F 11/1435* (2013.01)

(56) References Cited

U.S. PATENT DOCUMENTS

| | | | |
|---|---|---|---|
| 10,684,799 | B2 | 6/2020 | Ben Dayan et al. |
| 11,023,318 | B1 * | 6/2021 | Volkov ................ G06F 16/1805 |
| 2004/0133606 | A1 | 7/2004 | Miloushev et al. |
| 2005/0044080 | A1 | 2/2005 | Fridella et al. |
| 2006/0248088 | A1 | 11/2006 | Kazar et al. |
| 2010/0017444 | A1 | 1/2010 | Chatterjee et al. |
| 2013/0145085 | A1 | 6/2013 | Yu et al. |
| 2016/0350326 | A1 | 12/2016 | Simonetti |
| 2017/0097771 | A1 | 4/2017 | Krishnamachari |

OTHER PUBLICATIONS

European Office Communication with extended Search Report Appln No. 18871443.0 dated Jul. 6, 2021.
Int'l Search Report and Written Opinion Appln No. PCT/IB2018/001227 mailed Mar. 22, 2019 (14 pgs.).
Xu et al. "NOVA: A Log-structured File System for Hybrid Volatile/Non-volatile Main Memories." Feb. 2016. USEN IX. FAST '16. pp. 323-338.
Chinese Office Action with search report Appln No. 2018800582070 dated Feb. 13, 2023.

* cited by examiner

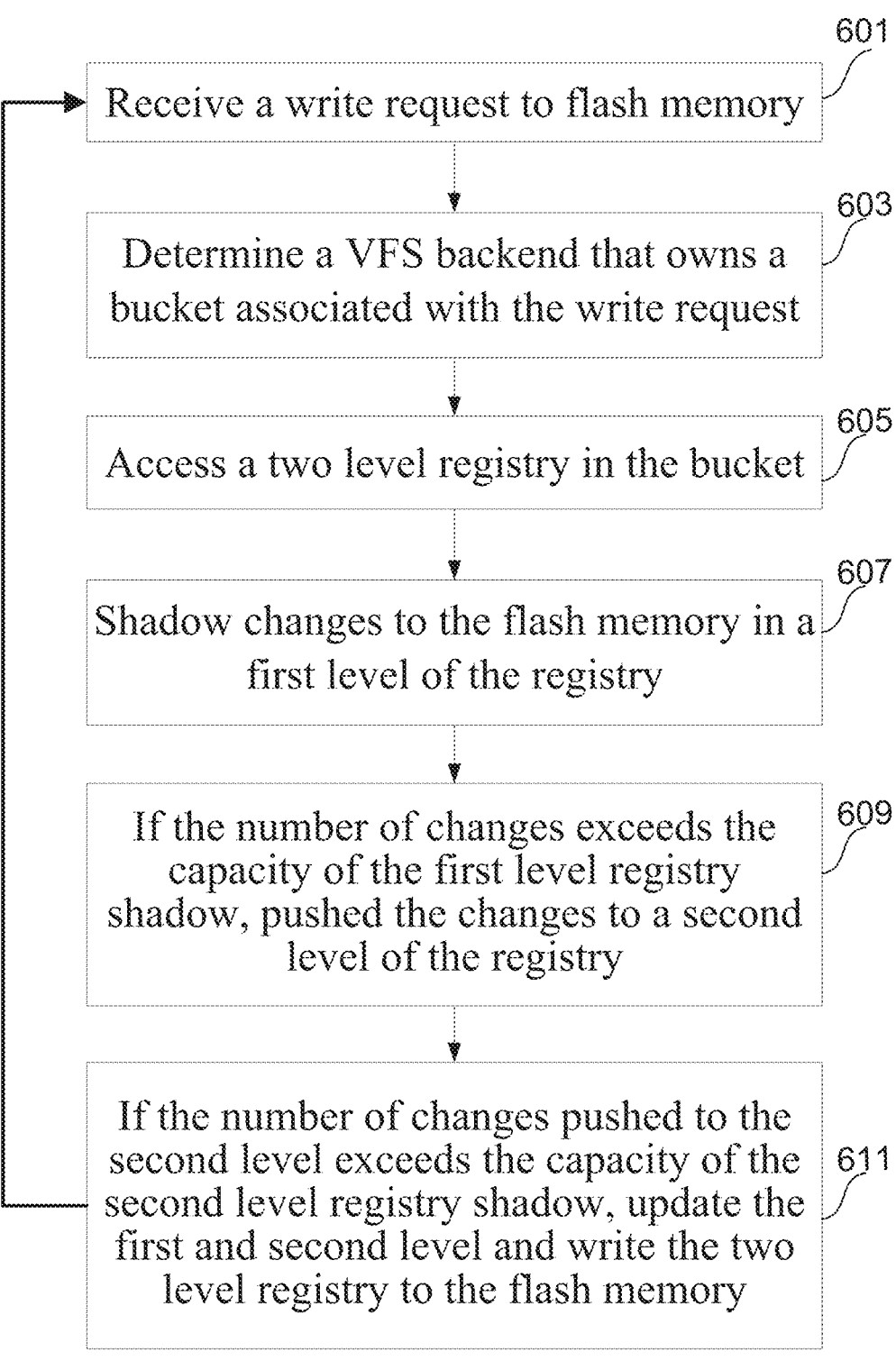

Receive a write request to flash memory    601

Determine a VFS backend that owns a bucket associated with the write request    603

Access a two level registry in the bucket    605

Shadow changes to the flash memory in a first level of the registry    607

If the number of changes exceeds the capacity of the first level registry shadow, pushed the changes to a second level of the registry    609

If the number of changes pushed to the second level exceeds the capacity of the second level registry shadow, update the first and second level and write the two level registry to the flash memory    611

FIG. 6

FLASH REGISTRY WITH WRITE LEVELING

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual File System" is hereby incorporated herein by reference in its entirety.

BRIEF SUMMARY

Methods and systems are provided for a NAND flash persisted registry with write leveling substantially as illustrated by and/or described in connection with at least one of the figures, as set forth more completely in the claims.

BRIEF DESCRIPTION OF THE DRAWINGS

FIG. 6 is a flowchart illustrating a method for write leveling using a flash registry in a load-balanced distributed storage system in accordance with an example implementation of this disclosure.

DETAILED DESCRIPTION

NAND flash devices support a limited number of writes over their lifetime, and the number of concurrent writes supported is lower than the number of the concurrent reads supported. Traditional tree based data structures are predominately used in designs, but are inefficient when they have to be persisted over NAND flash based media, because tree data-structures require writes to update all pointer layers when a leaf gets updated. Because NAND flash has a limited number of writes, tree data-structures are not suitable.

The data structure described in this disclosure trades writes for reads to be more efficient and less expensive for flash-based storage. This data structure provides write leveling as well as caching. Reading is also typically faster than writing. For example, some NAND flash based devices can do ten times the number of reads than writes in a given time. Therefore, aspects of the present disclosure provide for a suitable data structure for NAND flash that can effectively trade write operations with read operations.

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB "blocks" and 128 MB "chunks." "Extents" may be stored in volatile memory, e.g., RAM for fast access, backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the filesystem's namespace, this load can be distributed across a plurality of nodes.

Figure 1:
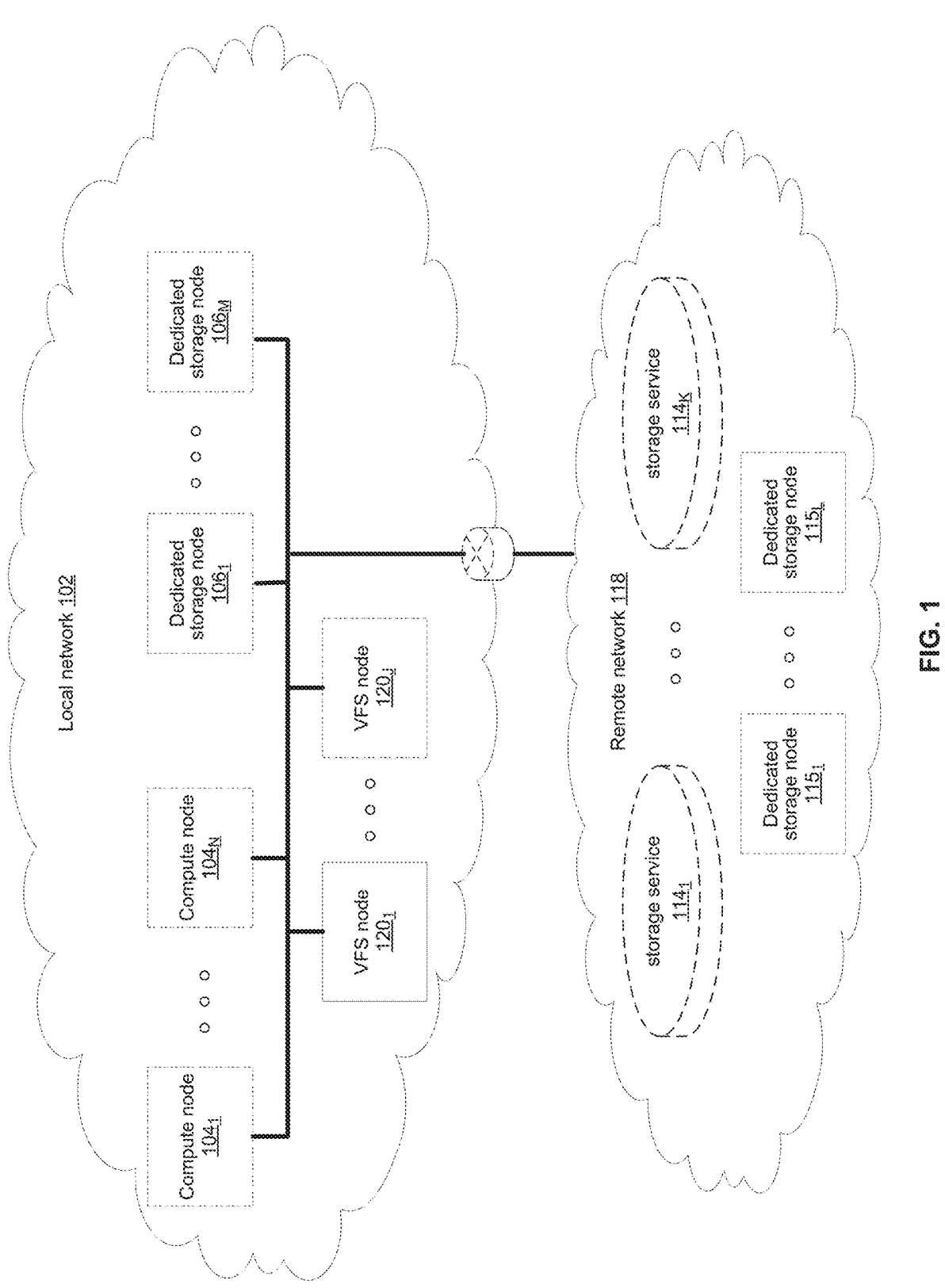
FIG. 1 illustrates various example configurations of a virtual file system in accordance with aspects of this disclosure.

FIG. 1 illustrates various example configurations of a virtual file system (VFS) in accordance with aspects of this disclosure. Shown in FIG. 1 is a local area network (LAN) 102 comprising one or more VFS nodes 120 (indexed by integers from 1 to J, for $j \geq 1$), and optionally comprising (indicated by dashed lines): one or more dedicated storage nodes 106 (indexed by integers from 1 to M, for $M \geq 1$), one or more compute nodes 104 (indexed by integers from 1 to N, for $N \geq 1$), and/or an edge router that connects the LAN 102 to a remote network 118. The remote network 118 optionally comprises one or more storage services 114 (indexed by integers from 1 to K, for $K \geq 1$), and/or one or more dedicated storage nodes 115 (indexed by integers from 1 to L, for $L \geq 1$).

Each VFS node $120_j$ (j an integer, where $1 \leq j \leq J$) is a networked computing device (e.g., a server, personal computer, or the like) that comprises circuitry for running VFS processes and, optionally, client processes (either directly on an operating system of the device $104_n$ and/or in one or more virtual machines running in the device $104_n$).

The compute nodes 104 are networked devices that may run a VFS frontend without a VFS backend. A compute node 104 may run VFS frontend by taking an SR-IOV into the NIC and consuming a complete processor core. Alternatively, the compute node 104 may run the VFS frontend by routing the networking through a Linux kernel networking stack and using kernel process scheduling, thus not having the requirement of a full core. This is useful if a user does not want to allocate a complete core for the VFS or if the networking hardware is incompatible with the VFS requirements.

Figure 2:
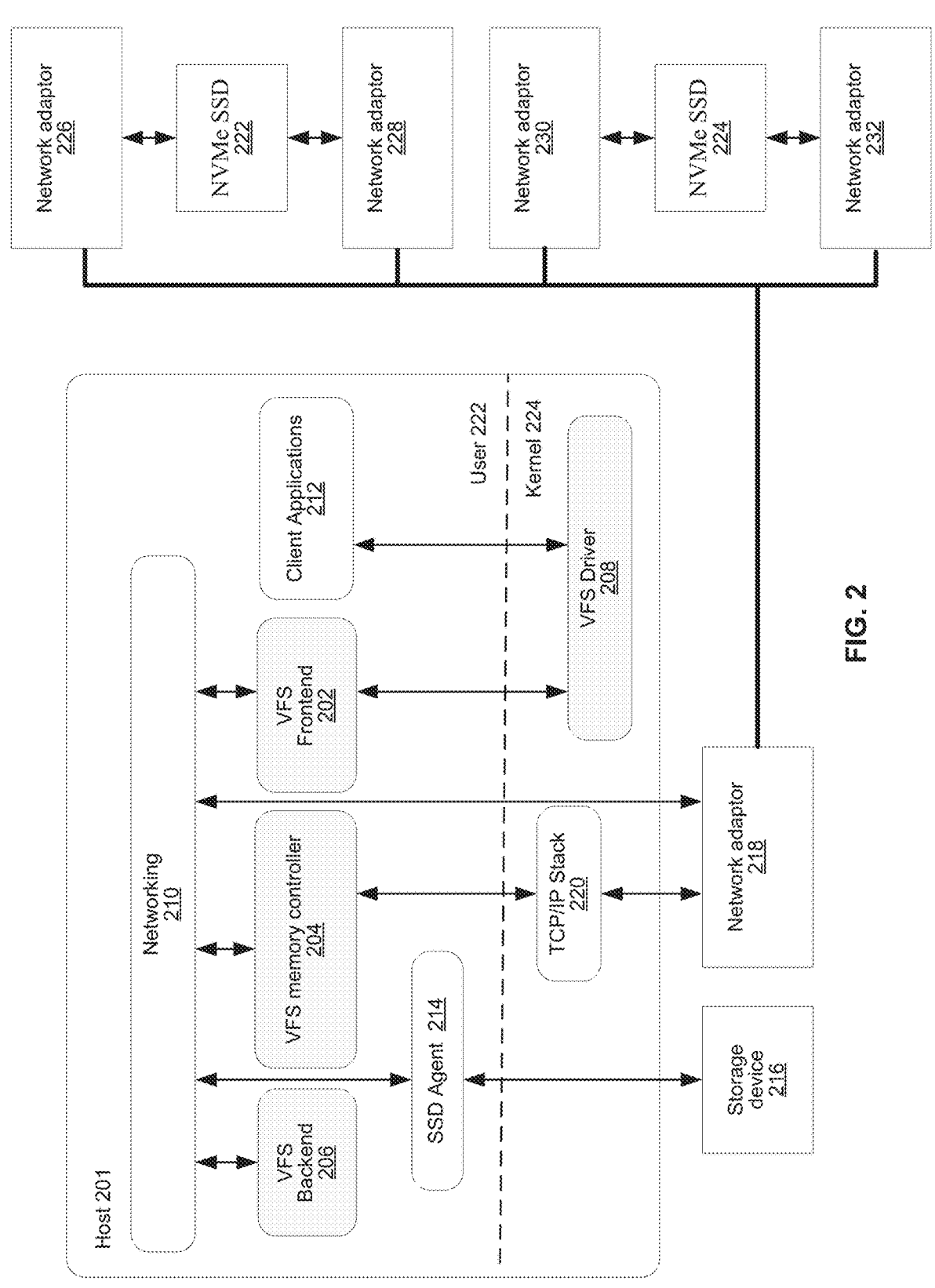
FIG. 2 illustrates an example configuration of a virtual file system node in accordance with aspects of this disclosure.

FIG. 2 illustrates an example configuration of a VFS node in accordance with aspects of this disclosure. A VFS node comprises a VFS frontend 202 and driver 208, a VFS memory controller 204, a VFS backend 206, and a VFS SSD agent 214. As used in this disclosure, a "VFS process" is a process that implements one or more of: the VFS frontend 202, the VFS memory controller 204, the VFS backend 206, and the VFS SSD agent 214. Thus, in an example implementation, resources (e.g., processing and memory resources) of the VFS node may be shared among client processes and VFS processes. The processes of the VFS may be configured to demand relatively small amounts of the resources to minimize the impact on the performance of the client applications. The VFS frontend 202, the VFS memory controller 204, and/or the VFS backend 206 and/or the VFS SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 in order to serve them.

The VFS node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The VFS node may be serviced by an operating system and/or a virtual machine monitor (VMM) (e.g., a hypervisor). The VMM may be used to create and run the VFS node on a host 201. Multiple cores may reside inside the single LXC container running the VFS, and the VFS may run on a single host 201 using a single Linux kernel. Therefore, a single host 201 may comprise multiple VFS frontends 202, multiple VFS memory controllers 204, multiple VFS backends 206, and/or one or more VFS drivers 208. A VFS driver 208 may run in kernel space outside the scope of the LXC container.

A single root input/output virtualization (SR-IOV) PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage media 216 attached via a PCI Express (PCIe) bus. The non-volatile storage media 220 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD 216 with the SSD agent 214 and networking 210. Alternatively, the SSD may be implemented as a network-attached NVMe SSD 222 or 224 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 222 and 224 to transform them into networked NVMe-oF devices without the use of a server. The NVMe SSDs 222 and 224 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by "sharding" the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

The VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

The VFS SSD agent 214 handles interactions with a respective storage device 216. This may include, for example, translating addresses, and generating the commands that are issued to the storage device (e.g., on a SATA, SAS, PCIe, or other suitable bus). Thus, the VFS SSD agent 214 operates as an intermediary between a storage device 216 and the VFS backend 206 of the virtual file system. The SSD agent 214 could also communicate with a standard network storage device supporting a standard protocol such as NVMe-oF (NVMe over Fabrics).

Figure 3:
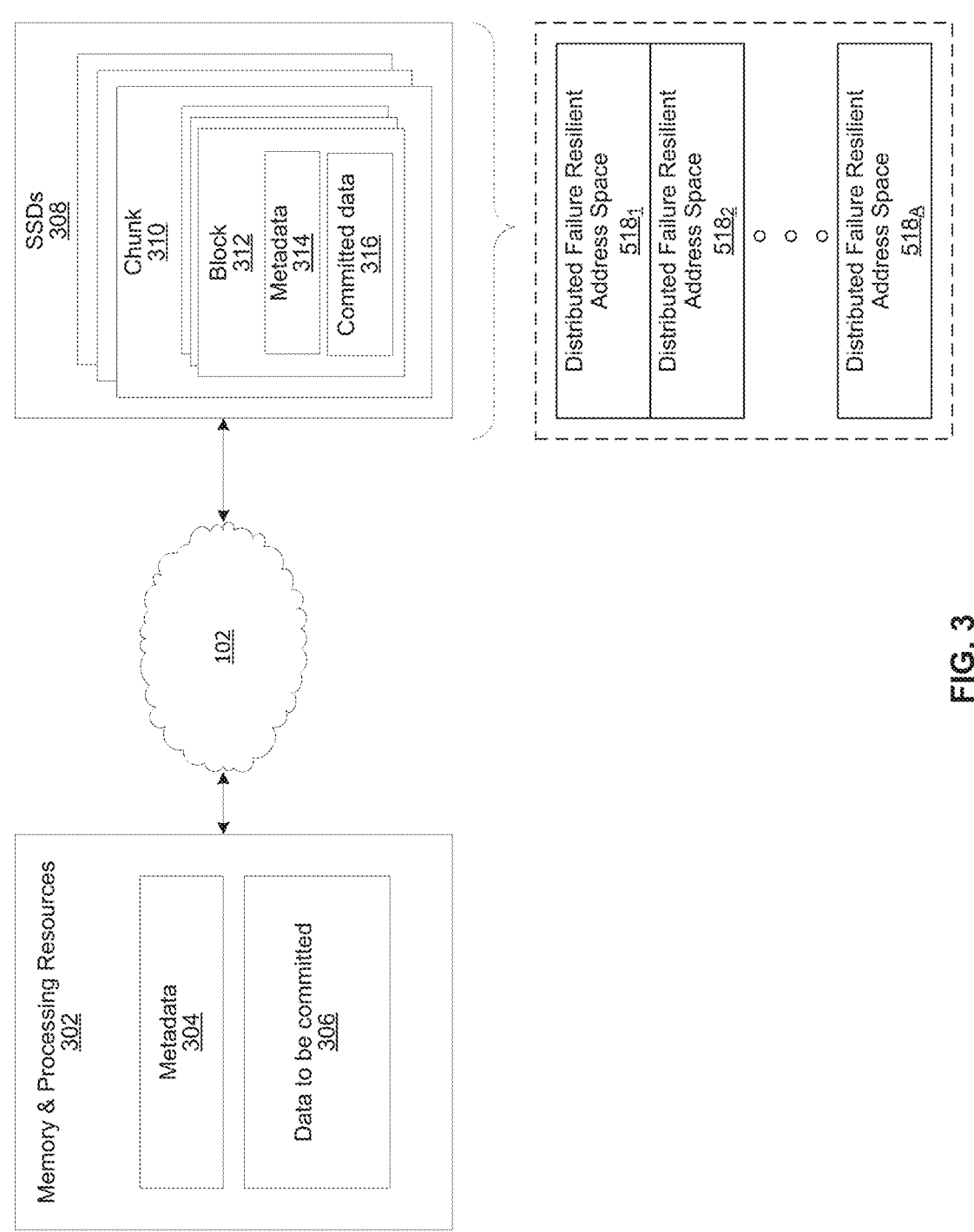
FIG. 3 illustrates another representation of a virtual file system in accordance with an example implementation of this disclosure.

FIG. 3 illustrates another representation of a virtual file system in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual file system, such as described regarding FIG. 2 above. The element 308 represents the one or more physical storage devices 216 which provide the long term storage of the virtual file system.

As shown in FIG. 3, the physical storage is organized into a plurality of distributed failure resilient address spaces (DFRASs) 518. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_J$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re]assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire filesystem metadata space (e.g., directory, file attributes, content range in the file, etc.) can be broken (e.g., chopped or sharded) into small, uniform pieces (e.g., "shards"). For example, a large system with 30 k servers could chop the metadata space into 128 k or 256 k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8 k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10 k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than 64,000 (26!/5!*(26−5)!) possible five-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the filesystem. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Since each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 518) and does not need to cooperate with other buckets to perform read or write operations. There are potentially thousands of concurrent, distributed erasure coding instances working concurrently, each for the different bucket. This is an integral part of scaling performance, as it effectively allows any large filesystem to be divided into independent pieces that do not need to be coordinated, thus providing high performance regardless of the scale.

Each bucket handles all the file systems operations that fall into its shard. For example, the directory structure, file attributes and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

Filesystem metadata is built out of directories, and directories keep information about files that are stored in them. Each file is represented by an inode block that keeps the basic data for that file, and each file is also represented by extent blocks that keep specific information about how ranges are stored in the filesystem. The registry is the data structure that holds all of the inode and extent information for the storage system. The registry also allows a translation between the different types of information. By using a key/value store, object IDs (i.e., keys) locate data within a 4 k block. The object IDs may be 32 bit wide, and the values may be 4 k blocks and a small tag.

For the "set" command, the registry receives an object kind ID (e.g., directory ID, inode ID, extent ID, etc.) and the new 4 k block value for that object. Part of the 4 k data stored is the ID of the object pointing to that 4 k block (i.e., a "backpointer").

For the "get" command the registry receives an object kind ID and the backpointer and returns either NULL (i.e., such object does not exist) or the 4 k representing that object.

The backpointer is important because different object kinds could get the same ID, but they cannot be pointed to by the same object ID. Therefore, knowing the object ID allows concurrent reads to be performed for all the blocks that may have the same object ID, and only the one with the correct backpointer is returned. Because these concurrent reads may be performed in parallel, the overall latency is kept very low. The number of concurrent buckets supported per node is based on how much RAM memory is provisioned to a registry.

The registry is used to go from pointers/keys to block data. Each bucket keeps and manages its own registry. The dirty part of the registry (i.e., information that has not been moved to flash yet) is in RAM. The registry data is also protected by distributed erasure coding (DEC) in the DFRAS. The registry can be fully reconstructed (sans the dirty parts) by another node becoming the leader for its bucket.

Figure 4:
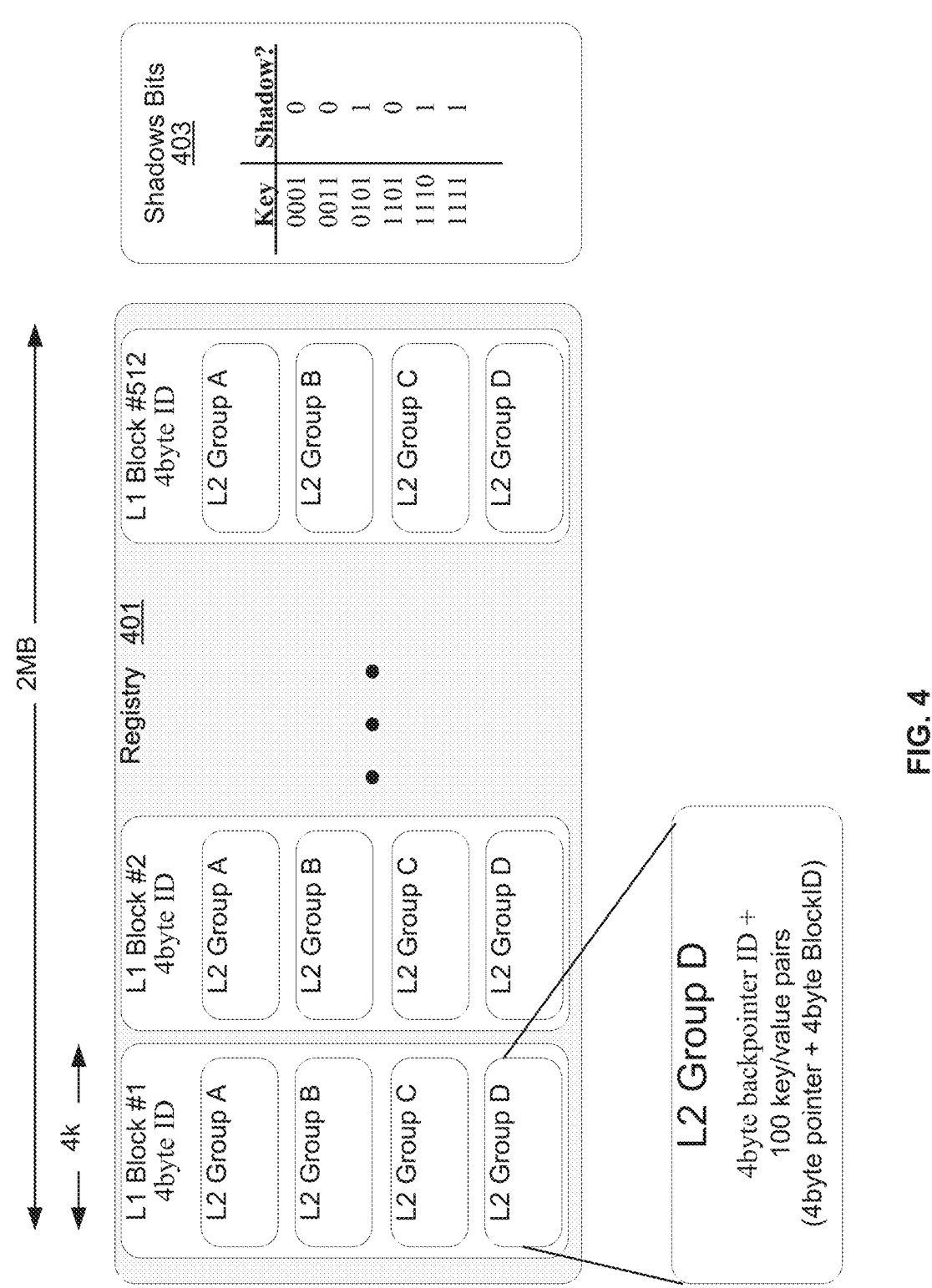
FIG. 4 illustrates an example of a flash registry with write leveling in accordance with an example implementation of this disclosure.

FIG. 4 illustrates an example of a flash registry 401 with write leveling in accordance with an example implementation of this disclosure. In this example, the registry comprises two kinds of entries—L1 (Level 1) entries and L2 (Level 2) entries. Each registry may hold 512 L1 blocks (2 MB total) in RAM. The correct L1 key (the index in the 512 array) is derived by the first 9 bits of the registry hash ID of the object. Each L1 block may hold data for four L2 groups, so there may be a total of 2,048 (512×4) L2 groups. Each L2 group is designated by the first 11 bits of the registry hash ID. First 9 bits point to the right L1 block, and then the other 2 bits pick the L2 group information within that L1 block.

Each L2 group of information is stored within about 1 kB of that L1 block. Each block stores also the 4 byte ID of the block ID pointing to it, so it can be verified in the lookup. This data-structure can therefore store data that is 4,092 bytes.

A plurality of sorted tuples of (key, value) in the 4 k blocks will eventually lead to the actual blocks of data, and the block of data is selected by the correct backpointer. Thus, a very good "branching factor" is achieved, and fewer updates are needed. Many L2 updates will update the same L1 block, and reaching the correct L2 block requires just two reads (read the L1 block that is in memory, which points to the correct L2 block).

Reading an object requires at least two hops. The number of hops is based on a branching factor to a table of about 400 pointers per 4 k block. The pointers are 4 bytes long and the block IDs stored in the distributed erasure coding (DEC) are also 4 bytes long so together each entry is 8 bytes.

The 1 kB in the L1 block may be used to load the correct L2 block for the actual data. The 1 kB lists ID ranges for each L2. When the system starts, there is a single L2 block for that range, holding all the ID ranges of the 21 bits that it spans (i.e., 32−11=21). When that L2 block gets full (reaches 4 k), it is split, and the L1 will then point to the two L2 blocks. When each of the L2 blocks gets full, the L2 block splits into two new L2 blocks. The L1 block pointing to the L2 block updates the ranges that each L2 block holds and updates the pointers to the new L2 blocks.

If there is a lot of random work on the system, then there will be a lot of value changes leading to a lot of L2 changes leading to some L1 changes that leads to a write amplification (i.e., more write operations for a single block write). However, write amplification may be "leveled" (i.e., reduced) by the use of a shadow registry.

Figure 5:
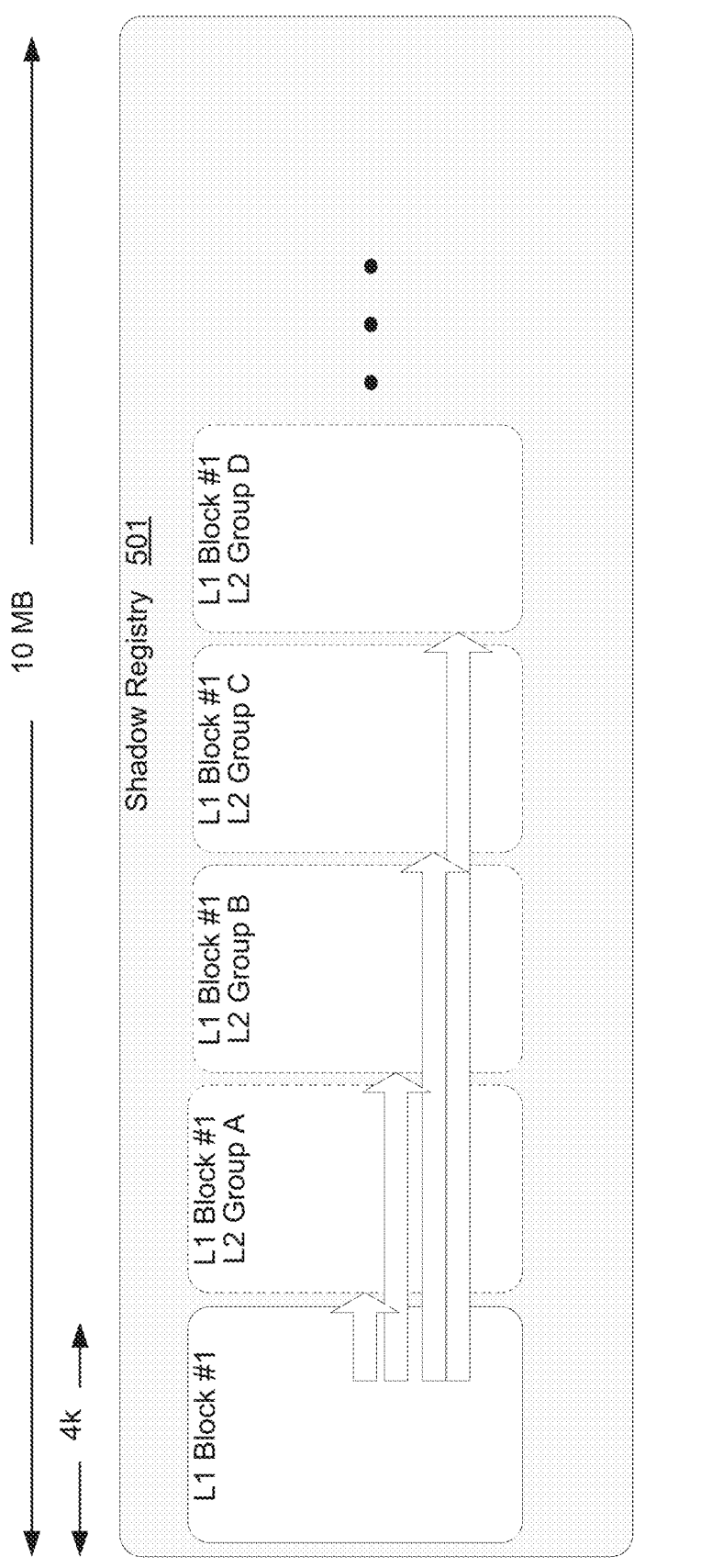
FIG. 5 illustrates an example of a shadow registry associated with the flash registry in FIG. 4 in accordance with an example implementation of this disclosure.

FIG. 5 illustrates an example of a shadow registry associated with the flash registry in FIG. 4 in accordance with an example implementation of this disclosure. Each L1 and L2 block may be associated with a 4 k "shadow" block that contains changes over the actual data that have yet to be committed to NVM.

For the flash registry 401 in FIG. 4 with 512 L1 blocks and 2,048 L2 blocks, the associated shadow registry comprises 10 Mbytes (2,560×4 k blocks). The shadow bits 403 indicated whether or not a 4 k value block has a shadow. A bit is set when a key (shown as 4 bits for illustration purposes) has an associated shadow value. Therefore, a search for the changes to a 4 k block is only performed when required. If a particular bit in the shadows bits 403 indicates that no shadow blocks exists for a 4 k value, the 4 k value is returned without searching the shadow registry 501.

By using shadow blocks, the actual 4 k block that stores the value does not need to change on each value change. When a portion of a 4 k value block has to change, the difference (which may be small) is stored in the L1 shadow block that follows the changes. Once a shadow block for an L1 gets full (e.g., 4 k of accumulated changes below that level), that L1 shadow block is then broken and the changes are pushed lower into the L2 shadow blocks, and then the L1 shadow blocks are cleared. When an L2 shadow block gets full (e.g., 4 k of accumulated changes over the values it points to), the changes are pushed into the actual value blocks (and the bit that indicates these blocks have shadowed data is cleared). Writing to flash is "leveled" because the actual 4 k data is not written to disk for any value set, but only once in a long while. The system may aggregate a large number of value sets to the registry to a single operation, so instead of a large number of 4 k block changes the system only writes a few updates to the relevant shadow L1 and L2 blocks, thus reducing the actual required writes to a minimum.

The shadow operation also works in reverse, by finding the actual 4 k value and checking whether there should be any changes applied over it by the relevant L1 and L2 shadows. Because this overlay check may be quite expensive, a large bitmap of all the values may be maintained in memory (e.g., RAM), and whether a key has stored overlay changes or not can be marked. Therefore, the search for the changes may be performed only when required. The bitmap is only stored in memory (e.g., RAM), but after a failure it can easily be reconstructed from the on-disk data-structure. Because this data-structure saves the state over many operations, it allows many writes to accumulate into a fewer number of on-disk writes.

FIG. 6 is a flowchart illustrating an example method for write leveling using a flash registry in a load-balanced distributed storage system. Each physical SSD comprises chunks of data (e.g., 128 MB chunks), and each chunk comprises blocks (e.g., 4 kB blocks). This physical memory is mapped to a plurality of logical extents (e.g., pointers to 256 blocks). This mapping is maintained in a VFS as a registry. The VFS backend comprises buckets that manage their associated registries.

At block 601, a VFS frontend receives a write request. At block 603, the VFS backend that owns the bucket associated with the write request is determined. This VFS backend may be on the same server as the VFS frontend that received the write request. Alternatively, this VFS backend may be on another server. At block 605, a two level registry in the bucket is accessed according to a function (e.g., hash) of an inode ID and offset. At block 607, changes being made to the flash memory (e.g., in the SSD) via the write are shadowed in a first level of the registry. At block 609, if the number of changes exceeds the capacity of the first level registry shadow, the changes are pushed to a second level of the registry. At block 611, if the number of changes pushed to the second level exceeds the capacity of the second level registry shadow, the first and second level registries are updated and written to the flash memory (e.g., in the SSD) along with the actual 4 k values that are associated with the keys that were stored in the L2 shadow page that got full. If the number of changes pushed to the second level registry does not exceed the capacity of the second level registry shadow, the bucket can continue to process write requests and metadata changes only making a few updates to the shadow pages and not needing to write a full 4 k page per each operation.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A method for controlling memory access, comprising:
distributing data into memory of a distributed file server concurrently via a plurality of computing devices, wherein each computing device of the plurality of computing devices is operable to read from and write to a designated portion of the memory independently of what other computing devices of the plurality of computing devices are doing;
accessing a two-level registry, wherein the accessing is performed concurrently via two or more of the plurality of computing devices;
recording changes being made to the memory in a first level of the registry;
using the two-level registry to make changes to data read from the memory,
wherein:
the recording is performed via a computing device of a plurality of computing devices,
the changes being made to the memory comprise changes in actual data values that have yet to be committed to the memory,
the actual data values are values of the distributed data other than the metadata, and
the two-level registry comprises a location of each of the changes being made to the memory;
if the number of changes exceeds the capacity of the first level of the registry, pushing the changes to a second level of the registry; and
if the number of changes pushed to the second level exceeds the capacity of the second level of the registry, updating the memory according to the changes recorded in the first level of the registry and the second level of the registry.

2. The method of claim 1, wherein the plurality of computing devices comprises a plurality of virtual file system (VFS) nodes.

3. The method of claim 1, wherein the two-level registry is protected by distributed erasure coding.

4. The method of claim 1, wherein the memory is non-volatile flash memory.

5. The method of claim 1, wherein the two-level registry is protected by verifying one or more backpointers, wherein a backpointer comprises a block ID of an object pointing to a registry block.

6. The method of claim 1, wherein the method comprises branching according to a table of pointers stored in a registry block.

7. A method for controlling memory access, comprising:
   distributing data into memory of a distributed file server concurrently via a plurality of computing devices, wherein each computing device of the plurality of computing devices is operable to read from and write to a designated portion of the memory independently of what other computing devices of the plurality of computing devices are doing;
   accessing a two-level registry, wherein the accessing is performed concurrently via two or more of the plurality of computing devices;
   recording changes being made to the memory in a first level of the registry, wherein:
      the recording is performed via a computing device of a plurality of computing devices,
      the changes being made to the memory comprise changes in actual data values that have yet to be committed to the memory,
      the actual data values are values of the distributed data other than the metadata,
      the two-level registry comprises a location of each of the changes being made to the memory, and
      a backpointer comprises a block ID of an object pointing to a registry block;
   if the number of changes exceeds the capacity of the first level of the registry, pushing the changes to a second level of the registry; and
   if the number of changes pushed to the second level exceeds the capacity of the second level of the registry, updating the memory according to the changes recorded in the first level of the registry and the second level of the registry wherein the two-level registry is protected by verifying one or more backpointers.

8. The method of claim 7, wherein the plurality of computing devices comprises a plurality of virtual file system (VFS) nodes.

9. The method of claim 7, wherein the two-level registry is protected by distributed erasure coding.

10. The method of claim 7, wherein the memory is non-volatile flash memory.

11. The method of claim 7, wherein the method comprises branching according to a table of pointers stored in a registry block.

12. A system for controlling memory access, comprising:
   memory of a distributed file server; and
   a plurality of computing devices operable concurrently to distribute data into the memory of the distributed file server, wherein:
      each computing device of the plurality of computing devices is operable to read from and write to a designated portion of the memory independently of what other computing devices of the plurality of computing devices are doing,
      a two-level registry is accessible concurrently by any computing device of the plurality of computing devices, the two-level registry is configured to shadow changes to the memory in a first level of the registry,
      the changes to the memory comprise changes in actual data values that have yet to be committed to the memory,
      the actual data values are values of the distributed data other than the metadata,
      the two-level registry comprises a location of each of the changes being made to the memory,
      the two-level registry is configured to push the changes to a second level of the registry if the number of changes exceeds the capacity of the first level of the registry,
      the two-level registry is configured to update the memory according to the changes recorded in the first level of the registry and the second level of the registry, if the number of changes pushed to the second level of the registry exceeds the capacity of the second level of the registry,
      the plurality of computing devices comprises a plurality of virtual file system (VFS) nodes, and
      the two-level registry is located in a bucket of metadata that is maintained on a VFS backend in a VFS node of the plurality of VFS nodes.

13. The system of claim 12, wherein the bucket metadata is one of a plurality of buckets on the VFS backend.

14. The system of claim 13, wherein each bucket of the plurality of buckets manages its own registry.

15. The system of claim 13, wherein the VFS backend is operable to make changes to data read from the memory according to the changes recorded in the two-level registry.

16. The system of claim 12, wherein the two-level registry is protected by distributed erasure coding.

17. The system of claim 12, wherein the memory is non-volatile flash memory.

18. The system of claim 12, wherein the two-level registry is protected according to a verification of one or more backpointers, wherein a backpointer comprises a block ID of an object pointing to a registry block.

19. The system of claim 12, wherein the computing device is operable to locate a block of memory according to a table of pointers stored in a registry block.

20. A method for controlling memory access, comprising:
   distributing data into memory of a distributed file server concurrently via a plurality of computing devices, wherein each computing device of the plurality of computing devices is operable to read from and write to a designated portion of the memory independently of what other computing devices of the plurality of computing devices are doing;
   accessing a two-level registry, wherein the accessing is performed concurrently via two or more of the plurality of computing devices;
   recording changes being made to the memory in a first level of the registry, wherein:
      the recording is performed via a computing device of a plurality of computing devices,
      the changes being made to the memory comprise changes in actual data values that have yet to be committed to the memory,
      the actual data values are values of the distributed data other than the metadata,
      the two-level registry comprises a location of each of the changes being made to the memory,
      the plurality of computing devices comprises a plurality of virtual file system (VFS) nodes, and the two-level registry is located in a bucket of metadata that is maintained on a VFS backend in a VFS node of the plurality of VFS nodes; and if the number of changes exceeds the capacity of the first level of the registry, pushing the changes to a second level of the registry; and if the number of changes pushed to the second level exceeds the capacity of the second level of the registry, updating the memory according to the changes recorded in the first level of the registry and the second level of the registry.

21. The method of claim 20, wherein the bucket metadata is one of a plurality of buckets on the VFS backend.

22. The method of claim 21, wherein each bucket of the plurality of buckets manages its own registry.

23. The method of claim 20, wherein the two-level registry is protected by distributed erasure coding.

24. The method of claim 20, wherein the method comprises using the two-level registry to make changes to data read from the memory.

25. The method of claim 20, wherein the memory is non-volatile flash memory.

26. The method of claim 20, wherein the two-level registry is protected by verifying one or more backpointers, wherein a backpointer comprises a block ID of an object pointing to a registry block.

27. The method of claim 20, wherein the method comprises branching according to a table of pointers stored in a registry block.

28. A system for controlling memory access, comprising:

memory of a distributed file server; and a plurality of computing devices operable concurrently to distribute data into the memory of the distributed file server, wherein:

each computing device of the plurality of computing devices is operable to read from and write to a designated portion of the memory independently of what other computing devices of the plurality of computing devices are doing, a two-level registry is accessible concurrently by any computing device of the plurality of computing devices, the two-level registry is configured to shadow changes to the memory in a first level of the registry, the changes to the memory comprise changes in actual data values that have yet to be committed to the memory, the actual data values are values of the distributed data other than the metadata, the two-level registry comprises a location of each of the changes being made to the memory, the two-level registry is configured to push the changes to a second level of the registry if the number of changes exceeds the capacity of the first level of the registry, the two-level registry is configured to update the memory according to the changes recorded in the first level of the registry and the second level of the registry, if the number of changes pushed to the second level of the registry exceeds the capacity of the second level of the registry, the two-level registry is protected according to a verification of one or more backpointers, and a backpointer comprises a block ID of an object pointing to a registry block.

29. The system of claim 28, wherein the plurality of computing devices comprises a plurality of virtual file system (VFS) nodes.

30. The system of claim 28, wherein the two-level registry is protected by distributed erasure coding.

31. The system of claim 28, wherein the memory is non-volatile flash memory.

32. The system of claim 28, wherein the computing device is operable to locate a block of memory according to a table of pointers stored in a registry block.

* * * * *